US006339370B1

(12) United States Patent
Rühl et al.

(10) Patent No.: US 6,339,370 B1
(45) Date of Patent: Jan. 15, 2002

(54) AUTOMATIC EMERGENCY CALL SYSTEM FOR MOTOR VEHICLES

(75) Inventors: Hans-Wilhelm Rühl, Solms; Jauke van Roekel, Laufdorf, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/546,071

(22) Filed: Apr. 10, 2000

(30) Foreign Application Priority Data

May 18, 1999 (DE) ........................................ 199 22 730

(51) Int. Cl.[7] .................................................. B60Q 1/00

(52) U.S. Cl. ....................... 340/436; 340/435; 340/438; 340/825.69; 340/993

(58) Field of Search ................................ 340/436, 435, 340/438, 992, 993, 825.69

(56) References Cited

U.S. PATENT DOCUMENTS 3,646,583 A * 2/1972 Scuderi .................... 340/52 H
5,223,844 A * 6/1993 Mansell et al. ............. 342/357
5,515,043 A * 5/1996 Berard et al. ............... 340/988
5,574,427 A * 11/1996 Cavallaro ................... 340/436
5,646,613 A * 7/1997 Cho ........................... 340/903
5,680,117 A * 10/1997 Arai et al. .................. 340/903
6,006,159 A * 12/1999 Schmier et al. ............. 701/200
6,076,028 A * 6/2000 Donnelly et al. ............. 701/45
6,124,784 A * 9/2000 Wells ......................... 340/438

FOREIGN PATENT DOCUMENTS

GE 3839959 A1 4/1990

* cited by examiner

*Primary Examiner*—Jeffery Hofsass
*Assistant Examiner*—Son Tang
(74) *Attorney, Agent, or Firm*—Mayer, Brown & Platt

(57) ABSTRACT

The invention proposes an emergency call system for a motor vehicle for automatically transmitting an emergency call to an external receiving station. The motor vehicle has measuring means, for example in the form of a radar system (6), for determining the relative speed and the distance of the vehicle in relation to another vehicle or an obstacle. If the current relative speed exceeds a predetermined limit value for a given distance, it is assumed that a collision is unavoidable, and an emergency call by a transmitter (3) provided in the motor vehicle is activated. Advantageously, the vehicle position, ascertained by means of a navigation system (4), is transmitted to the receiving station with the emergency call. The invention also provides for the emergency call system to be connected to further sensors (6), suitable for detecting a collision, so that the emergency call can be revoked if an actual collision is not reported by such a sensor within a predetermined time period.

24 Claims, 4 Drawing Sheets

Fig. 1
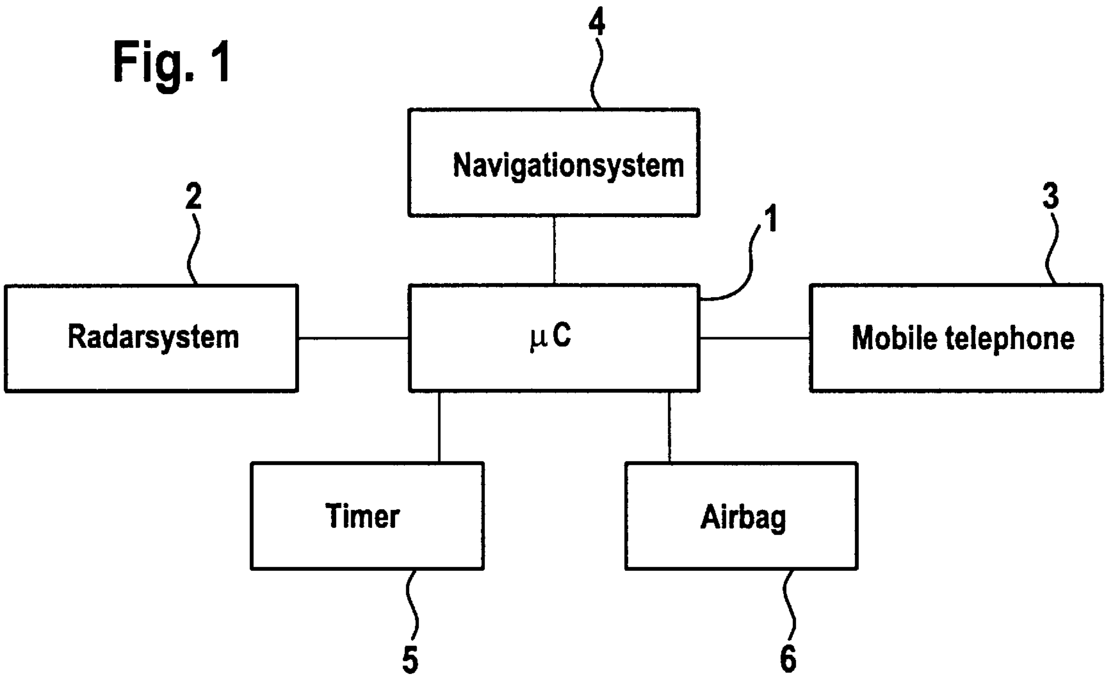
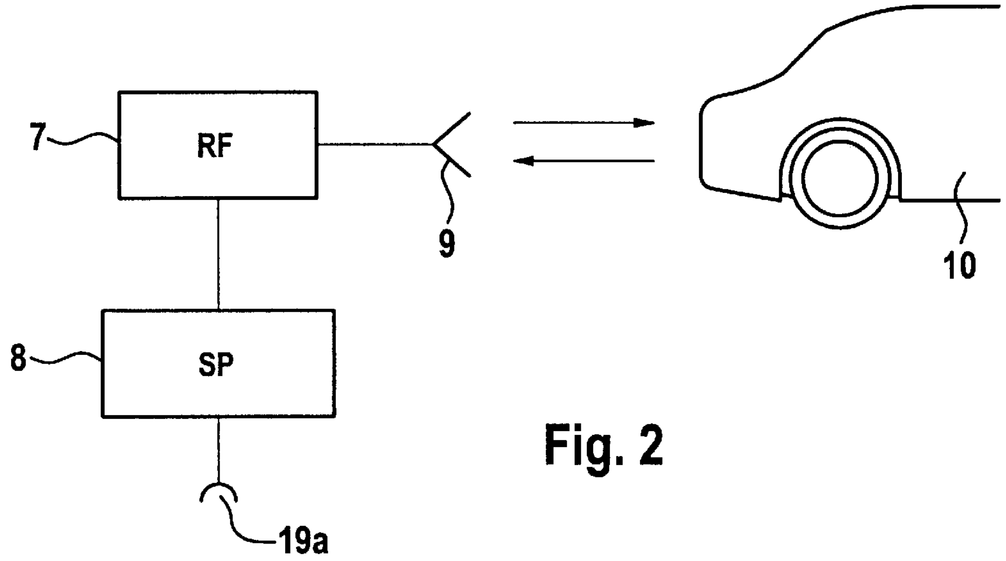
Fig. 2

AUTOMATIC EMERGENCY CALL SYSTEM FOR MOTOR VEHICLES

BACKGROUND OF THE INVENTION

1. Field of the Invention

The invention relates to an emergency call system for a motor vehicle, having a transmitter, provided in the motor vehicle, for automatically transmitting an emergency call to an external receiving station, and having a signal generator, the transmitter and the signal generator being connected to an arithmetic and logic unit which activates the emergency call if there is an appropriate signal from the signal generator, and to a method for automatically transmitting an emergency call from a motor vehicle to a receiving station using a transmitter.

2. Background of the Invention

Such an emergency call system is disclosed in WO 90/03899. A signal from a signal generator triggers an automatic emergency call. The signal generator can be an air bag, an alarm system or a temperature or gas sensor. The system can therefore activate an alarm using a mobile radio device in the event of the vehicle having a collision or being stolen, depending on the signal generator used. In addition, the emergency call system contains a navigation unit for determining and transmitting the position of the vehicle together with the emergency call. Further information, such as vehicle-related data, vehicle type, dangerous goods class, the telephone number, an accident report, a fire warning and the number of vehicle occupants can be transmitted with the emergency call. A disadvantage of this system, however, is that, in the event of a collision, the emergency call device can become damaged and is therefore sometimes inoperable. This means that the emergency call can no longer be transmitted.

SUMMARY OF THE INVENTION

The object of the invention is therefore to specify an emergency call system which avoids this disadvantage and ensures that the emergency call is transmitted reliably. A further object of the invention is to specify a method for automatically transmitting an emergency call from a motor vehicle to a receiving station.

The former object is achieved in an emergency call system of generic type in that the emergency call system contains means for determining a probability level for an imminent accident using the signals from the signal generator, and the emergency call can be activated if a limit value for the probability level is exceeded.

In particular, the emergency call system contains, as the signal generator, measuring means connected to the arithmetic and logic unit for determining the relative speed and the distance of the motor vehicle in relation to another vehicle or an obstacle, in which case the arithmetic and logic unit can perform a comparison between the relative speed determined using the measuring means and a maximum permissible value for the relative speed at the measured distance, and the emergency call can be activated if the maximum permissible relative speed for a given distance is exceeded. The emergency call can thus be activated even before an accident or a collision between the motor vehicle and another vehicle or an obstacle.

The method according to the invention is distinguished in that the distance and the relative speed of the motor vehicle in relation to another vehicle or an obstacle are ascertained, the relative speed ascertained is compared with a defined, maximum permissible relative speed for the distance ascertained, and an emergency call is triggered if the particular relative speed of the motor vehicle exceeds the defined, maximum permissible relative speed.

In the known emergency call system described in the introduction, the emergency call is transmitted only if a sensor registers a collision. For this purpose, the air bag signal is used, for example. In contrast to this, the emergency call system according to the invention can be used to establish that the collision is no longer avoidable even before it occurs. Consequently, the emergency call can therefore also be activated even before the collision occurs, that is to say at an instant when the emergency call system is still operable. To this end, the relative speed of the motor vehicle in relation to another vehicle or an obstacle is determined in the same way as the distance of the motor vehicle from the other vehicle or obstacle. If the relative speed exceeds a predetermined value for a given distance, it can be assumed that a collision is unavoidable.

Hence, for each distance between the motor vehicle and another vehicle or an obstacle, a maximum permissible limit value is defined for the relative speed. This limit value can be determined in the arithmetic and logic unit using a defining equation for the respective distance. However, it is also possible to store a plurality of value pairs, in each case for a distance and an associated maximum permissible relative speed, in a memory element, the memory element being connected to the arithmetic and logic unit. The arithmetic and logic unit then retrieves the value pairs which are nearest to the current distance and uses them to determine the maximum permissible relative speed of the vehicle, for example by means of interpolation.

In addition, there may be a variety of such limit values for the maximum permissible relative speed. By way of example, these can allow for the attributes of the road. Thus, a higher limit value is permissible, for example, for a dry road than for a wet road or snow-covered road. To determine the attributes of the road, the vehicle must be provided with appropriate sensors. As an example, dry and wet roads can be distinguished optically using the portion of light reflected from the road.

Although, in principle, it is also possible to locate the motor vehicle transmitting an emergency call, the vehicle position is preferably transmitted to the receiving station together with the emergency call. To this end, the vehicle is provided with, in particular, a navigation system which is known per se, in which case the position can be determined in a known manner using both satellite navigation (GPS navigation) and dead-reckoning navigation. Amongst the various functions of a navigation system, only position determination is of importance to the emergency call system, and not route calculation. Hence, it is also sufficient, for example, to use only a receiver with an evaluation unit for GPS navigation, rather than a full navigation system.

To prevent false alarms, in one particular embodiment, the arithmetic and logic unit in the emergency call system is connected to at least one sensor for detecting an accident. The emergency call system also contains a timer which is connected to the arithmetic and logic unit and is started when the emergency call is activated. If there is no signal signaling a collision from the sensor at the instant the timer runs out, the emergency call is automatically revoked.

If, for example, a driver still manages to steer clear of an obstacle and thus avoid a collision despite the relative speed being above the limit value, the revocation of the emergency call prevents auxiliary forces from being alerted. The sensor for detecting an accident can, in particular, be an acceleration sensor or a temperature sensor. Since acceleration sensors are already provided for releasing the air bag in motor vehicles, it is particularly advantageous if the emergency call system is connected to said acceleration sensors. Thus, if the air bag is not released by the time the timer runs out, it is assumed that there has been no collision and the emergency call is revoked. So that the revocation of the emergency call is not dependent on the signal from an individual sensor, a plurality of sensors can be provided. If a temperature sensor is provided, a vehicle fire, in particular, can also be registered.

To activate a sufficient number of rescue forces, a further provision, in a preferred embodiment, is that the arithmetic and logic unit in the emergency call system is connected to seat-occupancy sensors, so that the number of occupied motor vehicle seats can be transmitted with the emergency call.

An important integral part of the emergency call system according to the invention are the measuring means for determining the relative speed and the distance of the motor vehicle in relation to another vehicle or an obstacle. Preferably, these measuring means are based on the evaluation of a transmitted and received, reflected radar signal. Although such radar systems are not yet in standard use in motor vehicles, the expert is aware of them. The use of radar systems for providing distance warnings and for regulating distance in motor vehicles is described in Walliser et al.: Elektronik im Kraftfahrzeugwesen [Motor Vehicle Electronics], 2nd edition, Expert-Verlag, Renningen-Malsheim 1997, pages 308 to 331. Radar systems have the advantage over optical or acoustic methods that attenuation due to rain and mist is low. Possible frequencies specified are 35 GHz and 78 GHz.

In addition, WO 94/16340 describes a computerized radar method for measuring distances and relative speeds between a vehicle and obstacles in front of it. In this method, radar signals are transmitted which are reflected by another vehicle or an obstacle. The reflected radar signals are in turn picked up and evaluated. The relative speed between the motor vehicle containing the system and another vehicle or obstacle is determined on the basis of the Doppler shift in the frequency of the transmitted and reflected signals. Since the radar signal is transmitted in pulsed form, the timing of the pulse can be used to ascertain the distance between the motor vehicle and the vehicle or obstacle reflecting the radar pulse. To distinguish between actual obstacles and apparent obstacles reliably, the method described in the aforementioned patent application can be used, for example.

Any known radio system can be used for transmitting the emergency call. To ensure reliable transmission of the emergency call, this system should have universal coverage, however. On account of the fact that mobile radio systems based on the GSM standard are already very widespread in Europe, these systems are particularly preferred here, as are systems based on the more recent UMTS standard. These can be the known D and E networks, for example. Corresponding systems are sufficiently well known to the expert and are also established for use in motor vehicles, so that there is no need for them to be described in more detail here.

BRIEF DESCRIPTION OF THE DRAWINGS

The invention is explained in more detail below using an illustrative embodiment and the drawing, in which FIG. 1: shows the essential components of the emergency call system, FIG. 2: shows the components of a radar system.

DETAILED DESCRIPTION OF THE PREFERRED EMBODIMENTS

Figure 3:
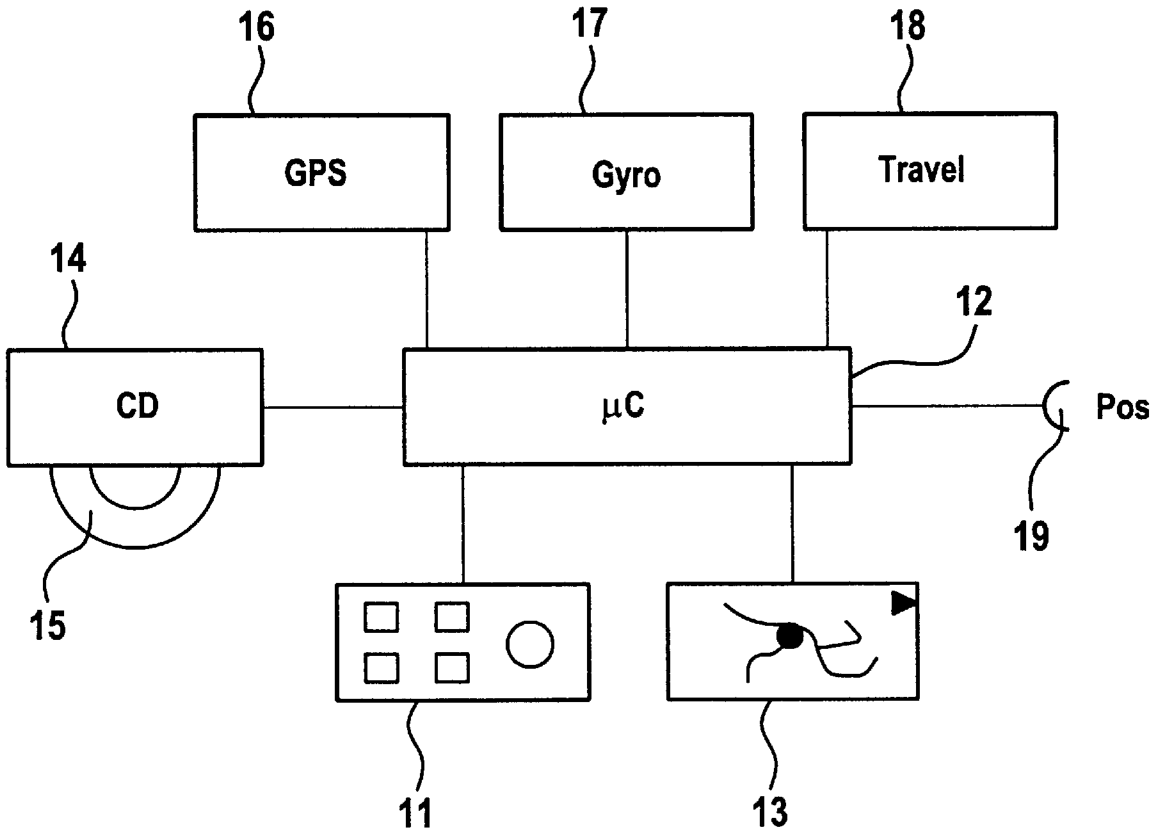
FIG. 3: shows the components of a navigation system.

The emergency call system shown in FIG. 1 contains, as its central element, the arithmetic and logic unit 1, which comprises a microcomputer and associated memory elements and interfaces. The arithmetic and logic unit 1 has a connected radar system 2, which ascertains the relative speed and the distance of the motor vehicle in relation to another vehicle or obstacle as described above. In addition, the arithmetic and logic unit is connected to a mobile telephone 3. A memory element of the arithmetic and logic unit 1 stores a defining equation for calculating a limit value for the maximum permissible relative speed at a given distance. The current distance of the motor vehicle from an obstacle is transmitted to the arithmetic and logic unit 1 by the radar system 2. On the basis of this distance value, the permissible limit value for the relative speed is determined in the arithmetic and logic unit 1. The current relative speed, which is also transmitted to the arithmetic and logic unit 1 by the radar system 2, is compared with this limit value. If the current relative speed of the motor vehicle is higher than the limit value, it is assumed that a collision is unavoidable. In this case, the arithmetic and logic unit 1 transmits an emergency call to a receiving station (not shown) using the mobile telephone 3. So that the position of the motor vehicle can also be transmitted to the receiving station at the same time as the emergency call, the arithmetic and logic unit 1 is also connected to a navigation system 4.

In addition, the arithmetic and logic unit 1 is connected to a timer 5. At the same time as the emergency call is activated by the arithmetic and logic unit 1, the timer 5 is started. The running time of the timer is typically only a few seconds. In addition, the arithmetic and logic unit 1 is connected to the air bag system 6 of the motor vehicle. If the motor vehicle collides with the obstacle, at least one air bag is released. The air bag's release is registered in the arithmetic and logic unit 1. If the arithmetic and logic unit 1 has no signal signaling that the air bag has been released when the timer 5 runs out, it is assumed that there has been no collision. In this case, the arithmetic and logic unit 1 activates a further radio call using the mobile telephone 3 or uses the existing connection to transmit a revocation of the emergency call.

FIG. 2 shows, in simplified block form, the inherently known components of a radar system for determining the relative speed and the distance. The radar system contains a radiofrequency section 7 and a signal processing section 8. The radiofrequency section 7 produces a pulsed microwave signal which is transmitted via a transmission/reception antenna 9. The microwave signal is reflected from a vehicle 10 traveling in front. Some of the reflected portion is picked up by the transmission/reception antenna 9 and is in turn supplied to the radiofrequency section 7. The transmitted signal and the received, reflected signal are separated in the radiofrequency section and supplied to a mixer separately. The signal processing section 8 carries out analog/digital conversion, and the signals, which are then digital, are processed further in a signal processor. An interface 19a is used to transfer the particular distance of the motor vehicle from the vehicle 10 traveling in front and the relative speed to the arithmetic and logic unit 1 of the emergency call system.

FIG. 3 gives a more detailed view of a navigation system for determining the vehicle position. A control unit 11 connected to a microprocessor 12 can be used to set system parameters for the navigation system. As an example, the desired form of representation for the information on the display unit 13 can be selected. In addition, the destination can be input or selected from a list of possible destinations displayed on the display unit 13. The control unit 11 and the display unit 13 can also be in the form of a combined control/display unit. In addition, information can also be input and output (not shown) using acoustic voice input and output means. The navigation system also contains a reader 14 which can be used to read digitized map data stored on a CD-ROM 15 or similar storage medium into the microprocessor 12.

In addition, further components for determining the position of the vehicle using dead-reckoning navigation and/or GPS navigation are connected to the microprocessor 12. These are a GPS receiver 16 which is equipped to receive signals from the GPS satellite system and can determine the position of the vehicle on the basis of the signals received. However, since the GPS signals sometimes cannot be received in valleys or towns, the navigation system also has a direction sensor 17 and a distance sensor 18 for carrying out dead-reckoning navigation. The vehicle position ascertained by the navigation system is transmitted to the arithmetic and control unit 1 of the emergency call system via the interface 19. The navigation system can be connected (not shown) to the mobile telephone or to an audio system, in which case the mobile telephone or audio system transmits current traffic information, which is taken into account for route planning, to the navigation system. To this extent, the navigation system is known. Amongst the various functions of the navigation system, only the determination of the vehicle position is of importance to the emergency call system.

In the embodiment described, a radar system, a navigation system and a mobile telephone are linked via the arithmetic and logic unit 1 in the manner of the invention. As well as in the arithmetic and logic unit 1, microprocessors are therefore contained both in the radar system 2 and in the navigation system 4. In a more highly integrated embodiment of the emergency call system according to the invention, the function of these individual microprocessors can also be moved to a common microprocessor, however.

Figure 4:
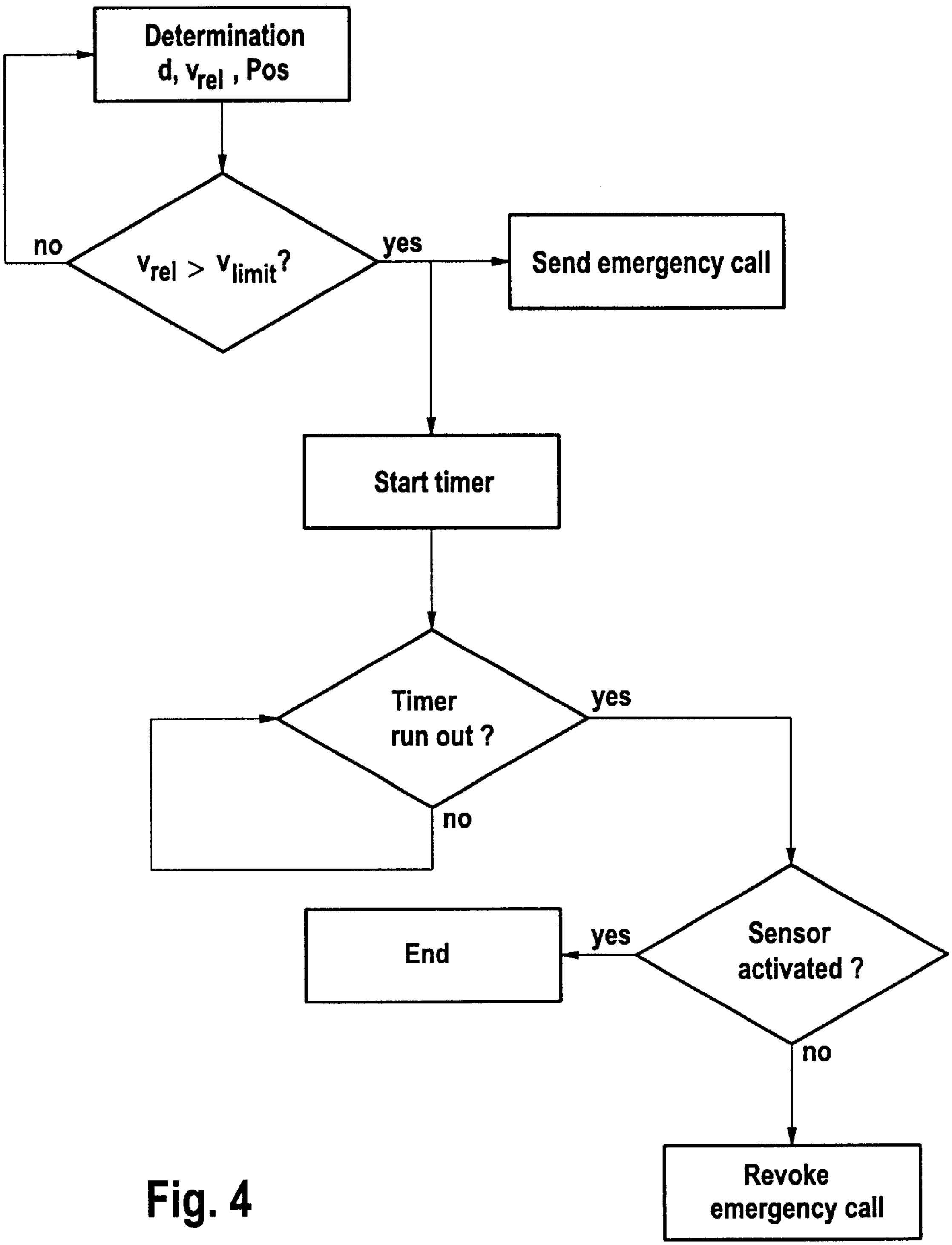
FIG. 4: shows the flow of the method.

FIG. 4 shows an embodiment of the method according to the invention in the form of a flow chart. The distance d and the relative speed $V_{rel}$ of the motor vehicle in relation to a vehicle traveling in front or an obstacle are determined continuously in the motor vehicle. In addition, the current vehicle position is constantly determined by means of the navigation system. The current relative speed of the motor vehicle is compared with the relative-speed limit value $V_{limit}$ which applies for the current distance of the motor vehicle. If the current relative speed $V_{rel}$ at a given distance is higher than the limit speed $V_{limit}$, it is assumed that a collision is unavoidable, and an emergency call is transmitted. At the same time, a timer is started. When the timer runs out, a check is carried out to determine whether a sensor detecting a collision with the motor vehicle, for example the air bag sensor, has been activated. If this is not the case, it is assumed that there has been no collision, and the emergency call is revoked.

Figure 5:
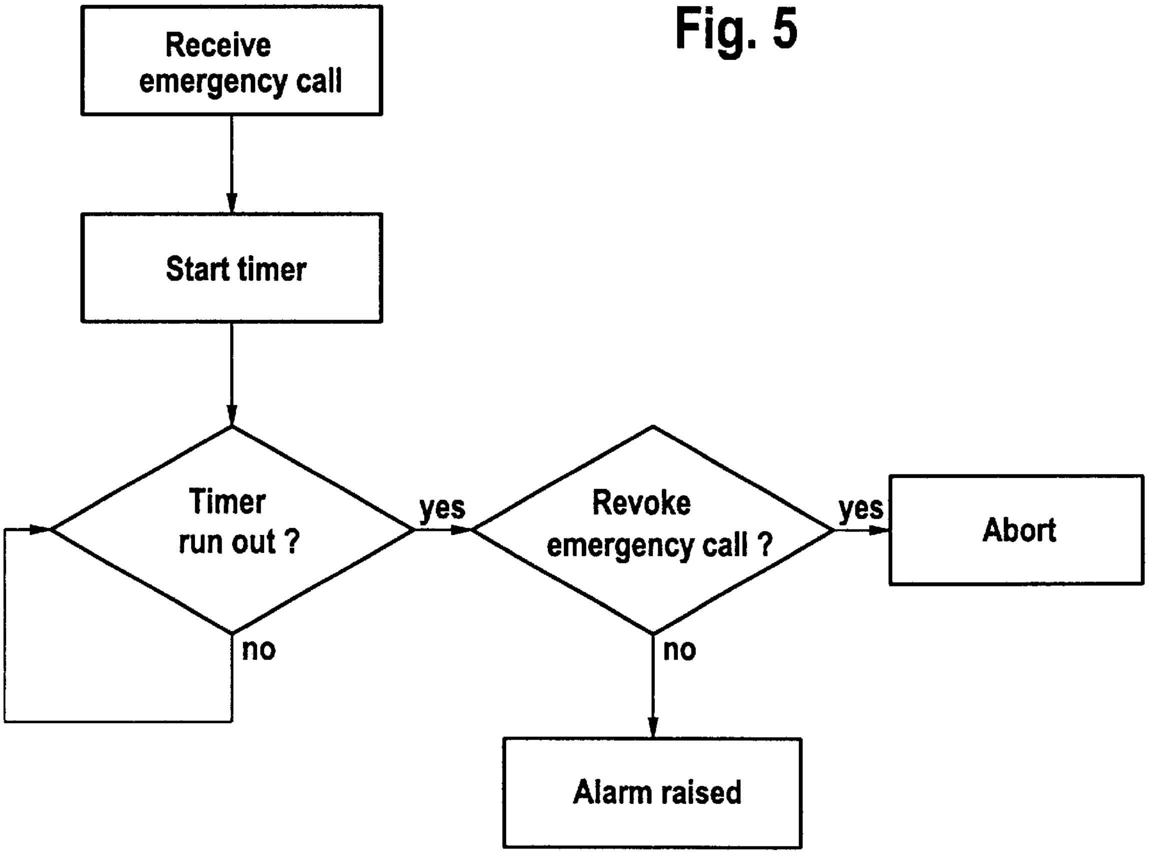
FIG. 5: shows the flow of the method for preventing false alarms in the receiving station.

So that an alarm is also not activated in the receiving station as soon as the emergency call is received, a timer is also started in the receiving station when the emergency call is received, as shown in FIG. 5, since the emergency call can still be revoked. The running time of the timer will again be only a few seconds. If the emergency call has been revoked by the time the timer runs out, the alerting method is aborted before the alarm has been raised. If the emergency call has not been revoked by the time the timer has run out, then the alarm is finally raised. This procedure ensures that the personnel in the receiving station is not constantly put on alarm standby by emergency calls which are received and then revoked. On the other hand, the delay, lasting only a few seconds, in raising the alarm is not expected to have any disadvantageous effect.

The emergency call system according to the invention has been described with the aid of an illustrative embodiment. Since the emergency call system also contains inherently known motor vehicle components, such as a speed and distance measuring system, a navigation system and a mobile telephone, a multiplicity of embodiments is possible. By way of example, an infrared system can also be used for speed and distance measurement. Furthermore, a complete mobile telephone is not necessary. A transmitter is adequate for the emergency call system according to the invention, so that the dialing keypad, the microphone and the loudspeaker of the mobile telephone are not necessary for the emergency call system according to the invention. For determining the vehicle position, another example of a conceivable system, besides the navigation system described, is one in which the position is transmitted into the motor vehicle by distance markers at the edge of the vehicle.

What is claimed is:

1. An emergency call system for a motor vehicle comprising:

a transmitter (3), provided in the motor vehicle, for automatically transmitting an emergency call to an external receiving station;

at least one signal generator, the transmitter and the signal generator being connected to an arithmetic logic unit (1) which activates the emergency call if there is an appropriate signal from the signal generator; and a means for determining a probability level for an imminent accident using the signals from the signal generator;

wherein the emergency call can be activated if a limit value for the probability level is exceeded.

2. The emergency call system as claimed in claim 1, wherein the emergency call system contains, as the signal generator, measuring means (2) connected to the arithmetic and logic unit for determining the relative speed and the distance of the motor vehicle in relation to another vehicle (10) or an obstacle, in which case the arithmetic and logic unit (1) can perform a comparison between the relative speed determined using the measuring means (2) and a maximum permissible value for the relative speed at the measured distance, and the emergency call can be activated if the maximum permissible relative speed for a given distance is exceeded.

3. The emergency call system as claimed in claim 1, wherein the emergency call can be activated even before an accident occurs.

4. The emergency call system as claimed in claim 1, wherein means connected to the arithmetic and logic unit for determining the vehicle position (4) are provided and the vehicle position can be transmitted to the receiving station with the emergency call.

5. The emergency call system as claimed in claim 4, wherein the means for determining the position are a navigation system for the motor vehicle.

6. The emergency call system as claimed in claim 1, wherein the arithmetic and logic unit is connected to at least one sensor (6) for detecting an accident, and the emergency call system also contains a timer (5) which is connected to the arithmetic and logic unit (1) and is started when the emergency call is activated, and the emergency call can be automatically revoked when the timer (5) has run out if no signal signaling an accident has been transmitted to the arithmetic and logic unit (1) by the sensor (6) by the time the timer (5) has run out.

7. The emergency call system as claimed in claim 6, wherein the sensor (6) for detecting an accident is an acceleration sensor, particularly for releasing an air bag, or a temperature sensor.

8. The emergency call system as claimed in claim 1, wherein the arithmetic and logic unit is connected to seat-occupancy sensors, and the number of occupied motor vehicle seats can be transmitted with the emergency call.

9. The emergency call system as claimed in claim 1, wherein the measuring means for determining the relative speed and the distance are based on the evaluation of a transmitted and received, reflected radar signal.

10. The emergency call system as claimed in claim 1, wherein the transmitter is an integral part of a mobile communication device, particularly of a digital mobile radio system.

11. The emergency call system as claimed in claim 10, wherein the mobile radio system is based on the GSM standard or on the UMTS standard.

12. The emergency call system as claimed in claim 1, wherein the position of the motor vehicle is determined using dead-reckoning navigation and/or GPS navigation.

13. A method for automatically transmitting an emergency call from a motor vehicle to a receiving station using a transmitter (3), comprising:

ascertaining the distance and the relative speed of the motor vehicle in relation to another vehicle (10) or an obstacle;

comparing the ascertained relative speed with a defined, maximum permissible relative speed for the distance ascertained; and triggering an emergency call if the particular relative speed of the motor vehicle exceeds the defined, maximum permissible relative speed;

wherein the collision between the motor vehicle and the other vehicle or obstacle is detected by means of a sensor (6), and the emergency call can be automatically revoked if no collision has been detected by the sensor within a predetermined time period after transmission of the emergency call.

14. The method as claimed in claim 13 further comprising determining the position of the motor vehicle and transmitting the position to the receiving station with the emergency call.

15. The method as claimed in claim 14 wherein the position of the motor vehicle is ascertained using dead-reckoning navigation and/or GPS navigation.

16. The method as claimed in claim 13 wherein the number of occupied seats in the motor vehicle is transmitted with the emergency call.

17. The method as claimed in claim 13 wherein the relative speed and the distance of the motor vehicle are determined using a radar system.

18. The method as claimed in claim 13 wherein the emergency call is made using a mobile communication device, in particular a digital mobile radio system.

19. A method for automatically transmitting an emergency call from a motor vehicle to a receiving station using a transmitter (3), comprising:

ascertaining the distance and the relative speed of the motor vehicle in relation to another vehicle (10) or an obstacle;

comparing the ascertained relative speed with a defined, maximum permissible relative speed for the distance ascertained;

triggering an emergency call if the particular relative speed of the motor vehicle exceeds the defined, maximum permissible relative speed, wherein the emergency call is transmitted before there is a collision between the motor vehicle and the other vehicle or obstacle.

20. The method as claimed in claim 19 further comprising determining the position of the motor vehicle and transmitting the position to the receiving station with the emergency call.

21. The method as claimed in claim 20 wherein the position of the motor vehicle is ascertained using dead-reckoning navigation and/or GPS navigation.

22. The method as claimed in claim 19 wherein the number of occupied seats in the motor vehicle is transmitted with the emergency call.

23. The method as claimed in claim 19 wherein the relative speed and the distance of the motor vehicle are determined using a radar system.

24. The method as claimed in claim 19 wherein the emergency call is made using a mobile communication device, in particular a digital mobile radio system.

* * * * *